United States Patent
Rau et al.

[19]

[11] Patent Number: 6,058,002
[45] Date of Patent: May 2, 2000

[54] COMMON MODE SIGNAL ATTENUATOR

[75] Inventors: C. Peter Rau, Apalachin; Glenn E. Wilson, Endicott, both of N.Y.

[73] Assignee: Emerson Electric Co., St. Louis, Mo.

[21] Appl. No.: 08/901,123

[22] Filed: Jul. 28, 1997

[51] Int. Cl.$^7$ ...................................................... H02H 1/00
[52] U.S. Cl. ............................ 361/119; 361/58; 361/113; 361/118
[58] Field of Search ............................... 361/58, 56, 111, 361/113, 118, 119

[56] References Cited

U.S. PATENT DOCUMENTS

| | | | |
|---|---|---|---|
| 3,812,292 | 5/1974 | Tink | 179/2 DP |
| 4,137,556 | 1/1979 | Sessa | 361/91 |
| 5,053,920 | 10/1991 | Goldstein | 361/111 |
| 5,353,189 | 10/1994 | Tomlinson | 361/118 |
| 5,448,443 | 9/1995 | Muelleman | 361/111 |
| 5,530,321 | 6/1996 | Sears | 315/283 |

OTHER PUBLICATIONS

*Surge Protectors for Telephone and Data Lines*, (1996) 2nd Edition, Citel, Inc.

*Primary Examiner*—Jeffrey Gaffin
*Assistant Examiner*—Stephen W. Jackson
*Attorney, Agent, or Firm*—Arnold, White & Durkee

[57] ABSTRACT

A common mode signal attenuator includes a magnetic core, and a communications cable having at least one conductor adapted to transmit a communications signal. The communications cable is magnetically coupled to the core to form an inductive element having a magnetic flux path passing through the core. The inductive element has a volt-time capacity of at least about 0.0001 volt-seconds.

An electrical transient suppression system includes an electronic device having a ground path, a communications cable, and a magnetic core. The communications cable has at least one conductor adapted to transmit a communications signal and is connected to the electronic device. The communications cable is magnetically coupled to the core to form a common mode signal attenuator having an inductance of about at least 10 times the inductance of the ground path.

A method for reducing electrical transients in a communications cable includes magnetically coupling the communications cable to a magnetic core. The communications cable has at least one conductor adapted to transmit a communications signal. The communications cable and magnetic core are coupled to form an inductive element having a magnetic flux path passing through the core. The inductive element has a volt-time capacity of at least 0.0001 volt-seconds.

21 Claims, 6 Drawing Sheets

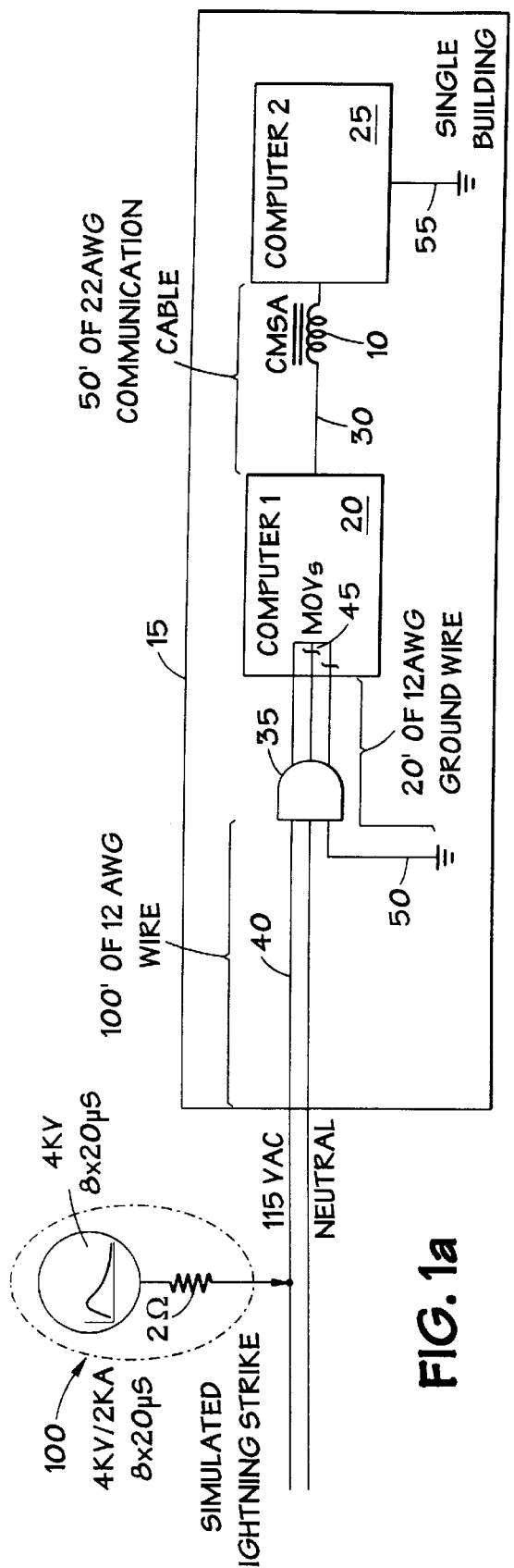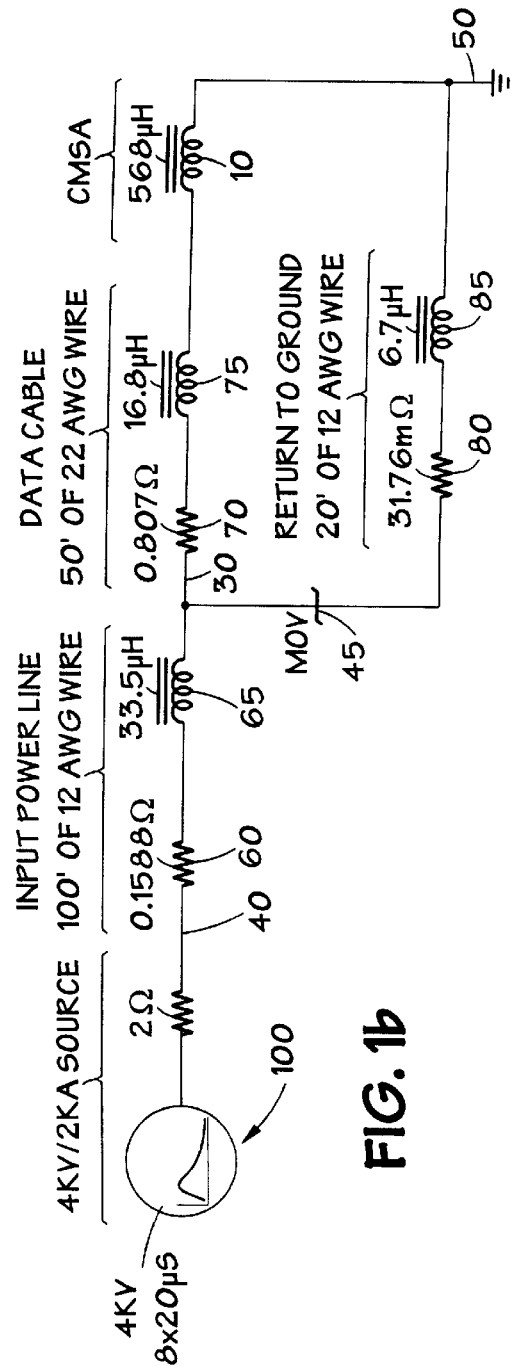
FIG. 1a
FIG. 1b

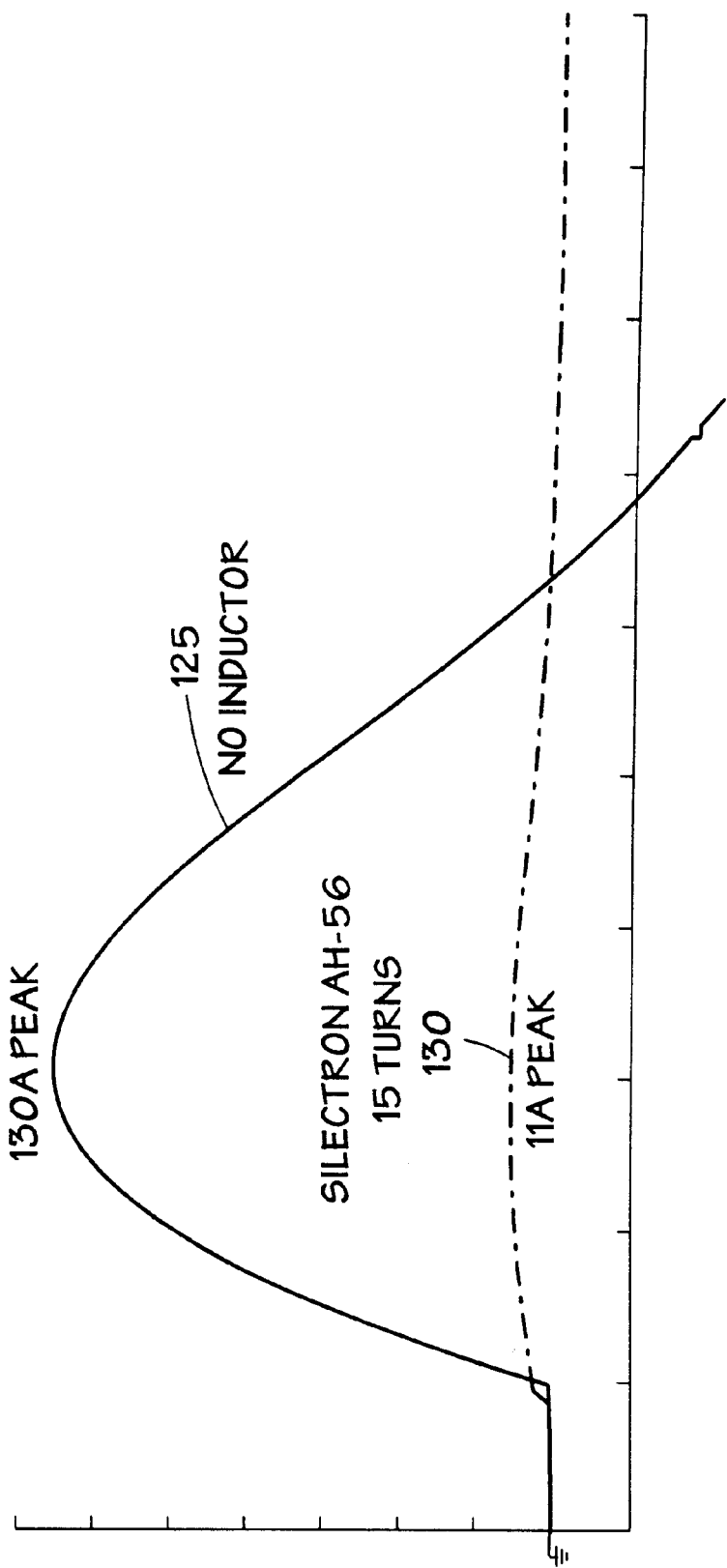

COMMON MODE SIGNAL ATTENUATOR

FIELD OF THE INVENTION

The present invention relates in general to transient suppression devices for protecting electrical loads from spikes and transients present on a power line, and more specifically to a common mode signal attenuator adapted to suppress common mode currents in a communications line.

BACKGROUND OF THE INVENTION

Undesirable power line transients have the potential to damage sensitive electrical equipment present on the line. Transients can be caused by external sources of energy such as a lightning strike, energy from an inductive load fed back to the line, or from power line switching. In order to protect the loads on the power line, this additional energy must be either dissipated or stored and later returned to the line.

Known voltage regulators and transient protection devices typically rely on shunting some or most of the extra energy into the ground return of the device being protected. Due to magnitude of the current that must be diverted into the ground circuit during a transient suppression, the "ground potential" of the protected device is raised well above true ground. In some cases the ground potential is raised due to the current flowing through the inductance in the ground return from the device being protected. This problem is especially apparent with equipment located in two different buildings, where the whole ground potential may raise due to true earth ground impedance.

Raising the potential of the protected device is not in and of itself a problem. However, if anything else is connected (e.g. by a communication cable) to the protected device that also has a reference to earth ground, excessive current may flow between the two devices through the communication cable. For example, in a computer connected to other devices such as a modem, printer, monitor, test equipment, another computer, or any other circuit that also has a reference to earth ground, the raised ground potential may cause an excessive current to flow between the communication cables connecting the equipment.

A known transient protection system is described in U.S. Pat. No. 5,448,443 to Muelleman. Muelleman adds inductance in series with the ground return. This added inductance further raises the ground potential during a transient, thereby amplifying the problem of unwanted and dangerous levels of current traveling down data lines and thus through the electronics which need to be protected.

Communications cables, such as monitor and keyboard cables, typically include a small filter designed to limit high frequency electromagnetic or radio frequency interference (EMI/RFI). These small filters do not have sufficient capacity to limit transient signals and saturate after only a small volt-time input.

SUMMARY OF THE INVENTION

The present invention in a broad aspect addresses the problems and shortcomings mentioned above. More specifically, an aspect of the invention is seen in a common mode signal attenuator, including a magnetic core, and a communications cable having at least one conductor adapted to transmit a communications signal. The communications cable is magnetically coupled to the core to form an inductive element having a magnetic flux path passing through the core. The inductive element has a volt-time capacity of at least about 0.0001 volt-seconds.

Another aspect of the invention is seen in an electrical transient suppression system, including an electronic device having a ground path, a communications cable, and a magnetic core. The communications cable has at least one conductor adapted to transmit a communications signal and is connected to the electronic device. The communications cable is magnetically coupled to the core to form a common mode signal attenuator having an inductance of about at least 10 times the inductance of the ground path.

A further aspect of the invention is seen in a method for reducing electrical transients in a communications cable. The communications cable has at least one conductor adapted to transmit a communications signal. The method includes magnetically coupling the communications cable to a magnetic core to form an inductive element having a magnetic flux path passing through the core. The inductive element has a volt-time capacity of at least 0.0001 volt-seconds.

BRIEF DESCRIPTION OF THE DRAWINGS

The foregoing and other advantages of the invention will become apparent upon reading the following detailed description and upon reference to the drawings in which:

FIG. 1a is a block diagram of an intra-building computer network;

FIG. 1b is a circuit diagram corresponding to the network of FIG. 1a;

FIG. 2b is a circuit diagram corresponding to the network of FIG. 2a;

FIG. 4c is a circuit diagram of the CMSA of FIG. 4a;

FIG. 6 is a graph of laboratory test results of the response of a CMSA of FIG. 4a to the lightning strike transient of FIG. 3.

DESCRIPTION OF ILLUSTRATIVE EMBODIMENTS

Figure 2A:
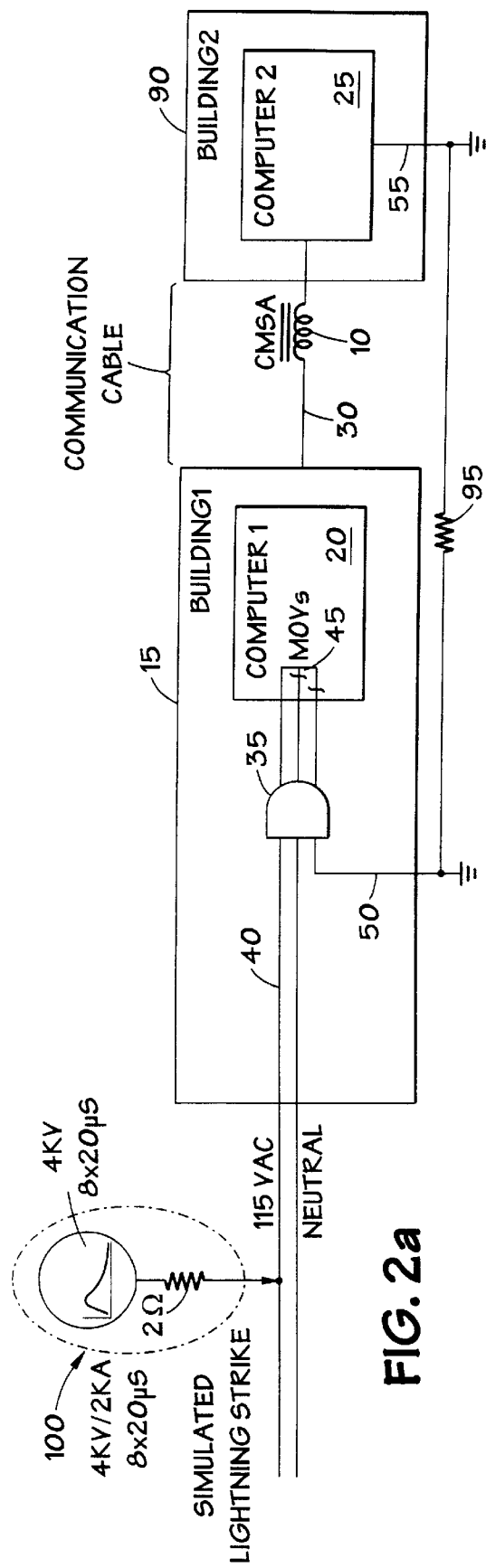
FIG. 2a is a block diagram of an inter-building computer network.

Referring to FIG. 1a, a block diagram of a computer network including a common mode signal attenuator (CMSA) 10 of the present invention is shown. The network is located in a single building 15. Computers 20 and 25 are connected by a communications cable 30. The communications cable 30 may be a serial cable, an interlink cable, a network cable, or any other cable for transmitting a communications signal. The communications cable 30 may include a plurality of conductors. The first computer 20 receives electrical power through a wall plug 35. The wall plug 35 is connected to a power line 40. The second computer 25 may be powered by the same power line 40 or perhaps an out of phase power line from the same source, or from a totally difference source.

Most computers 20, 25 have a limited form of internal lighting protection that will handle very light transients. In addition to the built in protection, computers typically have external transient protection to condition the power before it enters the power supply of the computer 20, 25. Both of these transient protection elements typically divert current into the ground path during activation. Diverting type transient protection devices typically include at least one metal oxide varistor (MOV) 45 that diverts excess current to ground. The ground path may be through the power line 40. Alternatively, the computer 20 may be grounded through a better source, e.g. to a steel post in a metal framed building 15. The first computer 20 has a ground path 50, and the second computer has a ground path 55. The ground paths 50, 55 may be the same ground path or alternatively, is different ground paths.

FIG. 1b is a circuit diagram of certain aspects of the network of FIG. 1a. The impedances of the power line 40, communications cable 30, and ground path 50 are shown. The resistances and inductances are calculated from widely available electrical property tables, and the lengths and wire sizes are chosen for illustrative purposes and are not to be regarded as limiting.

The impedance of the power line 40 is represented by a resistor 60 and an inductor 65. In the illustrative example, the power line is 100 feet of 12 AWG wire, which has a resistance of 0.1588Ω and an inductance of 33.5 μH. The impedance of the communications cable 30 is represented by a resistor 70 and an inductor 75. In the illustrative example, the communications cable is 50 feet of 22 AWG wire, which has a resistance of 0.807Ω and an inductance of 16.8 μH. The impedance of the ground path 50 is represented by a resistor 80 and an inductor 85. In the illustrative example, the ground path 50 is 20 feet of 12 AWG wire which is connected to a steel post in a metal framed building 15. The ground path 50 has a resistance of 31.76 mΩ and an inductance of 6.7 μH.

Figure 2B:
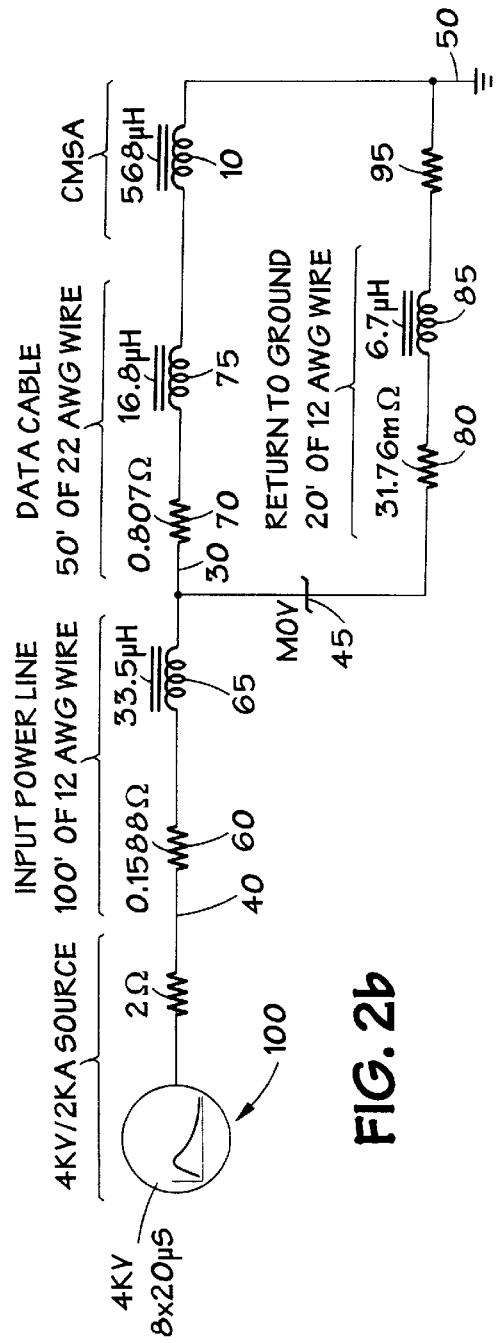

FIG. 2a and 2b represent a computer network similar to that of FIG. 1a and 1b with the exception that the second computer 25 is located in a second building 90. Because of the physical separation of the ground paths 50, 55 an additional earth impedance 95 is added.

Figure 3:
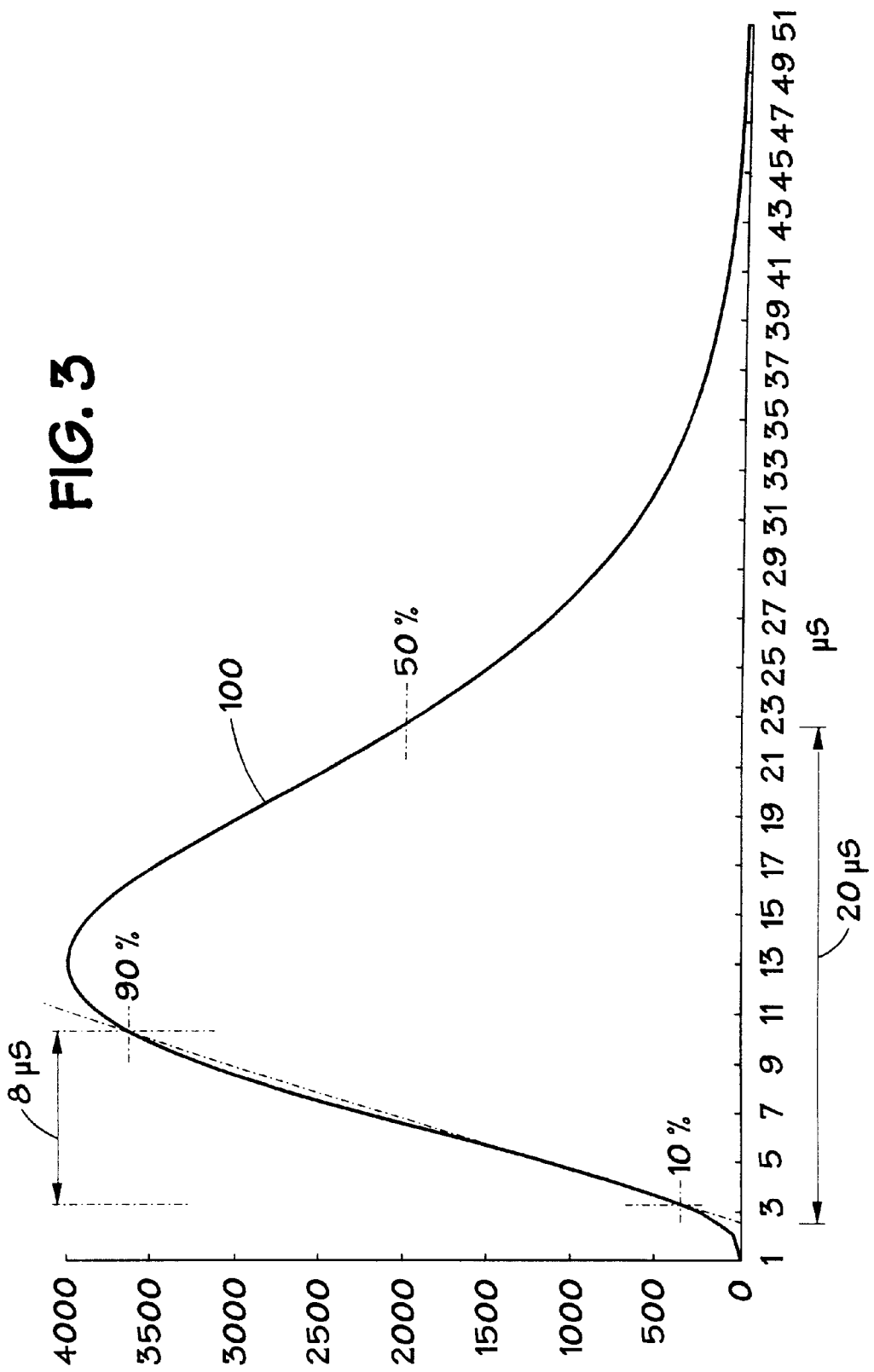
FIG. 3 is graph of a 8×20 $\mu$S waveform used to simulate a lightning strike transient.

An electrical transient 100, such as a lightning strike, may inject excess energy into the power line 40. A common waveform used to simulate a lightning strike is an 8×20 micro-second (μS) bi-wave. A graph of the simulated lightning pulse is shown in FIG. 3. The pulse has a peak of 4 KV (4,000 volts) and an output impedance of 2Ω. The equation for the simulated lighting pulse is:

$$V(t)=(4,977,927\times 10^{13})t^3 e^{(-t/.000,003,911)}. \tag{1}$$

As seen in FIG. 1b, when the electrical transient 100 is applied to the power line 40, some excess current will be diverted though the MOV 45 and into the ground path 50. A parallel current path is present through the communications cable 30 to ground. Consequently, when current flows into the ground path 50, it also flows through the communications cable 30. Communications cable 30 typically connect sensitive circuitry that would be damaged or destroyed if subjected to large currents.

The CMSA 10 is a common mode inductance device in series with the communication cable 30. The CMSA 10 installed on the communications cable 30 attenuates the common mode current which passes through the communications cable, thereby protecting the sensitive electronic equipment connected thereto. The CMSA 10 is effective in attenuating transients present on the power line 40 or transients introduced directly into the communications cable 30. The CMSA 10 allows a difference in potentials between the computers 20, 25 for a short period of time by suppressing the magnitude of the unwanted currents seen by the sensitive electronics attached to the communication cable 30, thereby allowing the transient protection circuitry time to divert the harmful extra incoming energy.

Figure 4A:
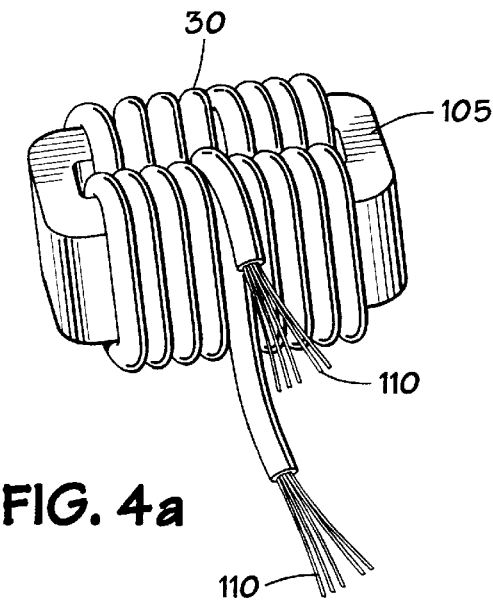
FIGS. 4a and 4b are pictorial representations of a common mode signal attenuator (CMSA) of the present invention.
Figure 4B:
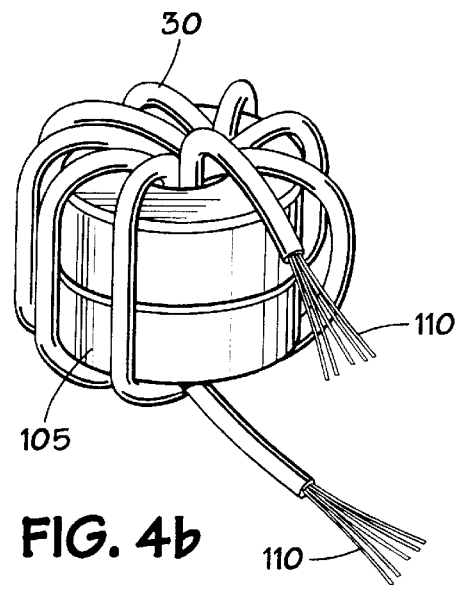
Figure 4C:
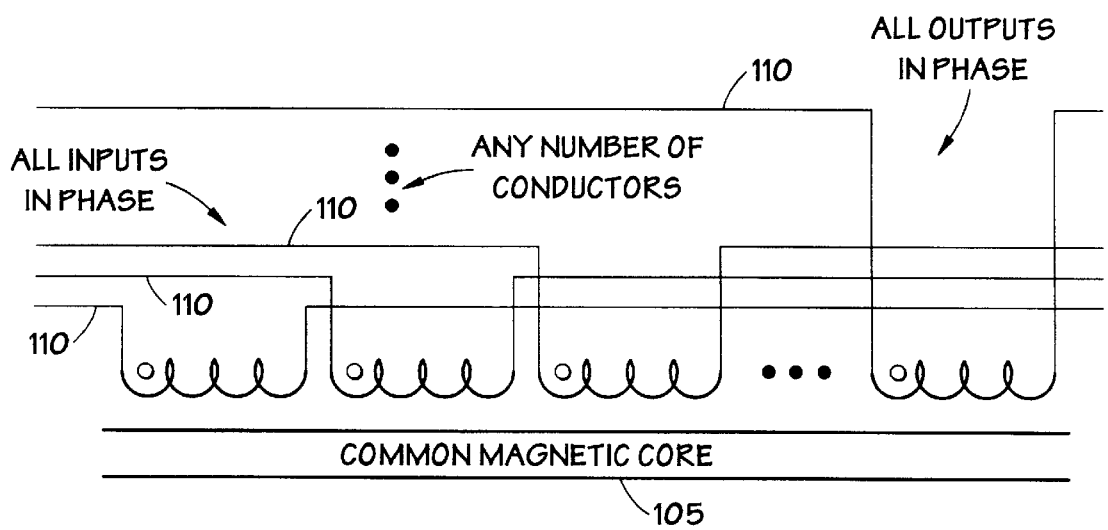

The CMSA 10 is described in greater detail in reference to FIGS. 4a, 4b, and 4c. FIGS. 4a and 4b illustrate a pictorial views of alternative embodiments of the CMSA 10, and FIG. 4c is a schematic diagram of the circuit formed in a CMSA. The CMSA 10 includes a magnetic core 105 about which the communications cable 30 is wound. The communications cable 30 illustrated in FIGS. 4a and 4b contains conductors 110 for transmitting communications signals. It is contemplated that the CMSA 10 be formed with a communication cable 30 having any number of conductors 110 as seen in FIG. 4c. Because the entire communications cable 30 is wound about the core 105, the phase relationships between signals in the individual conductors 110 are not affected (i.e. all inputs and outputs are in phase). The combination of the communications cable 30 and the magnetic core 105 form a series inductor in the communications cable without affecting the continuity of the individual conductors 110. The entire communications cable 30, which may include ground or shield, forms the inductor's electrical conductor. A flux path is established in the magnetic core 105.

FIG. 4a illustrates the CMSA 10 using a pair of c-shaped gapped cores. In the illustrative embodiment of FIG. 4a, the core 105 is made up of two AH-56 or CA-56 c-shaped cores manufactured by National-Arnold Magnetics of Adelanto, Calif. The c-shaped cores are constructed of grain-oriented 3% silicon steel laminations having a thickness of four thousands of an inch.

FIG. 4b illustrates an alternative toroid shaped core 105. Numerous toroids having a uniform built-in gap throughout the core are commonly available and are suitable for use with a CMSA 10 of the present invention.

It is contemplated that the core 105 may have a variety of shapes, sizes, and materials of construction depending on the materials available and the desired inductance of the CMSA 10. Alternative core materials, including but not limited to, ferrites, and powdered iron are contemplated.

The energy stored in the CMSA 10 during a transient 100 is stored in the gap of the core 105. If a toroid such as that shown in FIG. 4b is used, the energy is stored in the hidden gaps that are evenly distributed throughout the core. If two "C" cores such as those shown in FIG. 4a, an "IC" pair, an "EI" pair, or any other combined sections are used, then an appropriate external gap may be selected.

A theoretical analysis of the circuit of FIG. 1b with the transient 100 shown in FIG. 3 yields a desired inductance of 568 μH for the CMSA 10 in order to limit the magnitude of the current through the communications cable 30 to 10A, a magnitude sufficiently low to be handled safely by most electrical equipment connected to communication lines 30. The required inductance for the CMSA 10 may vary depending on the specific installation and resulting circuit model, therefore a range of inductance values for the CMSA 10, such as between 200 μH and 2000 μH, is contemplated.

The ratio between the inductance of the CMSA 10 and the inductance of the return to ground (represented by inductor 85) affects the amount of current that passes through the communications cable 30 relative to the amount of current passing through the return to ground. The ratio in the illustrated example is approximately 85:1 (CMSA 10 to inductor 85). This ratio may vary depending on the degree of protection desired and the sensitivity of the communications signals transmitted over the communications cable to the added inductance of the CMSA 10. If the CMSA is used in conjunction with other external transient protection devices, a smaller ratio (i.e. 10:1) may be desired, or if a greater degree of protection is desired a larger ratio (i.e. 300:1) may be used.

The following computational analysis to derive the inductance for a CMSA 10 using a "AH-56" Silectron core is provided for illustrative purposes and is not to be regarded as limiting. In order to calculate the required inductance and resulting parameters for a CMSA 10 in the simulated circuit of FIG. 1b, the volt-time product seen by CMSA is calculated. In the analysis, the diameter of the communications cable 30 is not included due to the relatively small contribution. Because, the transient 100 is rapid, and the CMSA 10 reduces the current in the communications cable 30 by orders of magnitude, the effect of the wire diameter is minimal. The volt-time product and the required inductance were calculated using equation I as the voltage source and the fundamental inductance equation:

$$V = L(di/dt), \quad (2)$$

where L is the inductance of the CMSA 10. The relationship between voltage and current is defined by Ohm's Law:

$$V = IR. \quad (3)$$

A simplified theoretical analysis of equations 1, 2, and 3 for the circuit of FIG. 1b, determined that the CMSA 10 would see approximately 0.005943 volt-seconds and need approximately 568 μH of inductance to limit the current in the communications cable 30 to 10 amps. The input waveform shown in FIG. 3 is a single bi-wave that drops back down to zero voltage. The source impedance of the transient 100 is 2Ω as seen in FIG. 1b, and the current is limited to 10 amps in the illustrated example. Accordingly, the volt-time product is addressed from time 0 to the time when the transient 100 waveform decreases to 20 volts (i.e. where the current in the communications cable 30 cannot be greater than 10 amps due to 2Ω source impedance of the transient 100).

The AH-56 core used in the illustrative example has a rating of 17 kG (kiloGauss). The parameters of the CMSA 10 constructed with the "AH-56" core were adjusted to provide an inductance near the required theoretical value of 568 μH. To prevent the core from saturating, the flux density should be less than 17 kG. In the exemplary calculations, a flux density of 16 kG was selected for conservatism. The number of turns and to a lesser degree, the distance of the gap in the core effect the resultant inductance of the CMSA 10 and the allowable volt-seconds. The number of turns and gap were chosen by an iterative process. In the illustrated example, values of 15 turns and 0.0005 inches of gap were chosen. However, other values for the number of turns and the gap length are contemplated. It is contemplated that the CMSA have a volt-time capacity of at least about 0.0001 volt-seconds.

The permeability is given by the following equation:

$$u = \frac{(B_{max})(2.54)(L_m)}{(.4\pi)(N)(I_{max})} = 1628 \ G/Oersted, \quad (4)$$

where $B_{max}$ is the maximum flux density (16 kG), $L_m$ is the length of the AH-56 core (7.55 in), N is the number of turns (15) and $I_{max}$ is the maximum current (10A).

The inductance of the AH-56 core is derived from the permeability:

$$L = \frac{(3.192 \times 10^{-8})(N^2)(A_{in})(K_s)}{L_m/u + L_g} = 590 \ \mu H, \quad (5)$$

where $A_{in}$ is the core cross-sectional area of the AH-56 core (0.46875 in²), $K_s$ is the stacking factor for the AH-56 core (0.9), and $L_g$ is the length of the gap (0.0005 in).

The maximum flux density in the CMSA 10 in the illustrated example is defined by:

$$B = \frac{(10^8)(VS)}{(2.54)^2(A_{in})(N)} = 13.1 \ kG, \quad (6)$$

where VS is the volt-seconds seen by the CMSA 10 during the transient 100 defined by equation 1 (0.005943 volt-seconds). The calculated flux density of 13.1 kG is well below the saturation point of 16–17 kG for grain oriented silicon steel.

Figure 5:
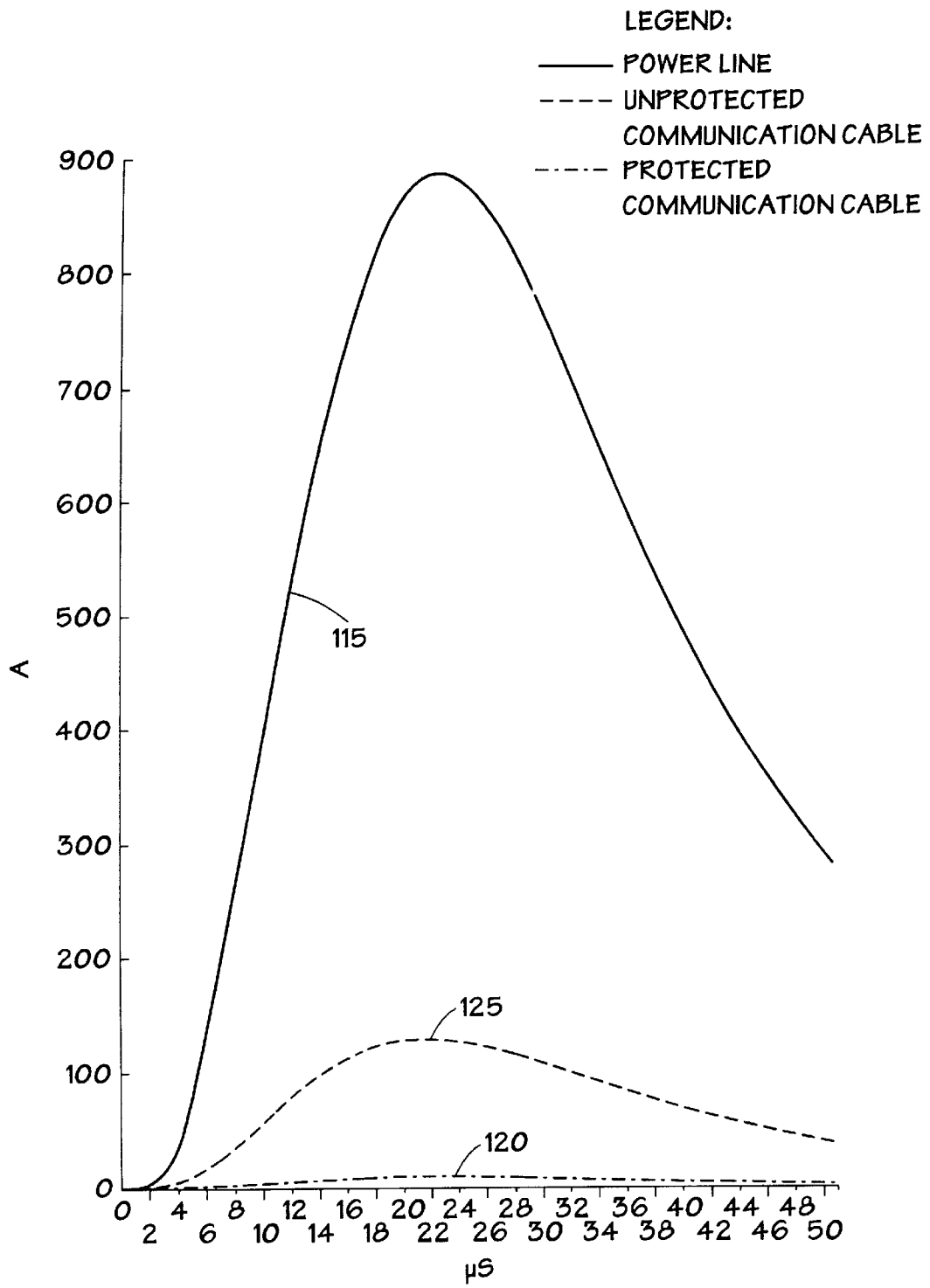
FIG. 5 is a graph of the simulated response of a CMSA of FIG. 4a to the lightning strike transient of FIG. 3.

FIGS. 5 and 6 illustrate the effect of the CMSA 10 on the current through the communications cable during the transient 100. FIG. 5 represents simulated results and FIG. 6 represents experimental results. FIG. 5 shows the transient waveform 115, and the simulated communications cable current 120. The unprotected cable current 125 was derived from the experimental test results shown in FIG. 6. FIG. 6 shows the experimental communications cable current 130 and the unprotected cable current 125.

As seen in FIGS. 5 and 6, the transient waveform 115 peaks at about 880 A during the lighting strike transient 100. The simulated communications cable current 120 and the experimental communications cable current 130 were determined to be 11A with the CMSA 10 installed on the communications cable. The unprotected cable current 125 (i.e. without the CMSA 10 ) peaked at 130A, a level that could have potentially damaged or destroyed equipment attached to the communications cable 30.

Although the invention is described with respect to a communications cable 30 connecting two computers 20, 25, the invention may be applied to a communications cable 30 connecting any electronic equipment. Some illustrative examples of devices to be protected include a printer, modem, monitor, test equipment, game port, serial port, parallel port, ethernet port, or any other communications interface. The types of communication cabling may be individual wires, twisted pair, stranded, unstranded, coaxial cable, twinaxial cable, phone line, speaker wire, or any other shielded or unshielded conductors.

While the invention is susceptible to various modifications and alternative forms, specific embodiments have been shown by way of example in the drawings and have been described in detail herein. However, it should be understood that the invention is not intended to be limited to the particular forms disclosed. It will be appreciated by those of ordinary skill having the benefit of this disclosure that numerous variations from the foregoing illustrations will be possible without departing from the inventive concept described herein. Accordingly, it is the claims set forth below, and not merely the foregoing illustration, which are intended to define the exclusive rights claimed in this application.

What is claimed is:

1. A common mode signal attenuator, comprising:
   a magnetic core; and
   a communications cable having a first end and a second end, the communications cable comprising at least one conductor adapted to transmit a communications signal, the communications cable being magnetically coupled to the core at a point between the first end and the second end to form an inductive element having a magnetic flux path passing through the core, the inductive element having a volt-time capacity of at least about 0.0001 volt-seconds, the at least one conductor being continuous from the first end to the second end.

2. The common mode signal attenuator as in claim 1, wherein the communications cable is connected to an electronic device having a ground path, and wherein the inductance of the common mode signal attenuator is about at least 10 times the inductance of the ground path.

3. The common mode signal attenuator as in claim 1, wherein the communications cable is connected to an electronic device having a ground path, and wherein the inductance of the common mode signal attenuator is between about 50 and 150 times the inductance of the ground path.

4. The common mode signal attenuator as in claim 1, wherein the inductance of the inductive element is between about 200 $\mu$H and 2000 $\mu$H.

5. The common mode signal attenuator as in claim 1, wherein the conductor includes a shield.

6. The common mode signal attenuator as in claim 1, wherein the conductor comprises at least one of a twisted pair of wires, a plurality of straight wires, a stranded wire, an unstranded wire, a coaxial cable, and a twinaxial cable.

7. The common mode signal attenuator as in claim 1, wherein the communications cable is wound about the core.

8. The common mode signal attenuator as in claim 7, wherein the communications cable is wound about the core a predetermined number of turns.

9. An electrical transient suppression system, comprising:
   an electronic device having a ground path;
   a communications cable having a first end and a second end, the communications cable comprising at least one conductor adapted to transmit a communications signal connected to the electronic device; and
   a magnetic core, the communications cable being magnetically coupled to the core at a point between the first end and the second end to form a common mode signal attenuator having an inductance of about at least 10 times the inductance of the ground path, the at least one conductor being continuous from the first end to the second end.

10. The electrical transient suppression system as in claim 9, wherein the inductance of the common mode signal attenuator is between about 50 and 150 times the inductance of the ground path.

11. The electrical transient suppression system as in claim 9, wherein the inductance of the common mode signal attenuator is between about 200 $\mu$H and 2000 $\mu$H.

12. The electrical transient suppression system as in claim 9, wherein the communications cable is wound about the core.

13. The electrical transient suppression system as in claim 9, wherein the conductor includes a shield.

14. The electrical transient suppression system as in claim 9, wherein the conductor comprises at least one of a twisted pair of wires, a plurality of straight wires, a stranded wire, an unstranded wire, a coaxial cable, and a twinaxial cable.

15. The electrical transient suppression system as in claim 9, wherein the common mode signal attenuator has a volt-time capacity of at least about 0.0001 volt-seconds.

16. A method for reducing electrical transients in a communications cable having a first end and a second end, the communications cable comprising at least one conductor adapted to transmit a communications signal, the method comprising:
   magnetically coupling the communications cable to a magnetic core at a point between the first end and the second end to form an inductive element having a magnetic flux path passing through the core, the inductive element having a volt-time capacity of at least about 0.0001 volt-seconds, the at least one conductor being continuous from the first end to the second end.

17. The method as in claim 16, further comprising:
   connecting the communications cable to an electronic device, the electronic device having a ground path,
   wherein the magnetically coupling comprises magnetically coupling the communications cable to the magnetic core to form an inductive element having an inductance of about at least 10 times the inductance of the ground path.

18. The method as in claim 16, further comprising:
   connecting the communications cable to an electronic device, the electronic device having a ground path,
   wherein the magnetically coupling comprises magnetically coupling the communications cable to a magnetic core to form an inductive element having an inductance of between about 50 and 150 times the inductance of the ground path.

19. The method as in claim 16, wherein the magnetically coupling comprises magnetically coupling the communications cable to a magnetic core to form an inductive element having an inductance of about between 200 $\mu$H and 2000 $\mu$H.

20. The method as in claim 16, wherein the magnetically coupling comprises winding the communications cable about the core.

21. The common mode signal attenuator as in claim 17, wherein the winding comprises winding at least one of a twisted pair of wires, a plurality of straight wires, a stranded wire, an unstranded wire, a coaxial cable, and a twinaxial cable about the core.

* * * * *